UNITED STATES PATENT OFFICE.

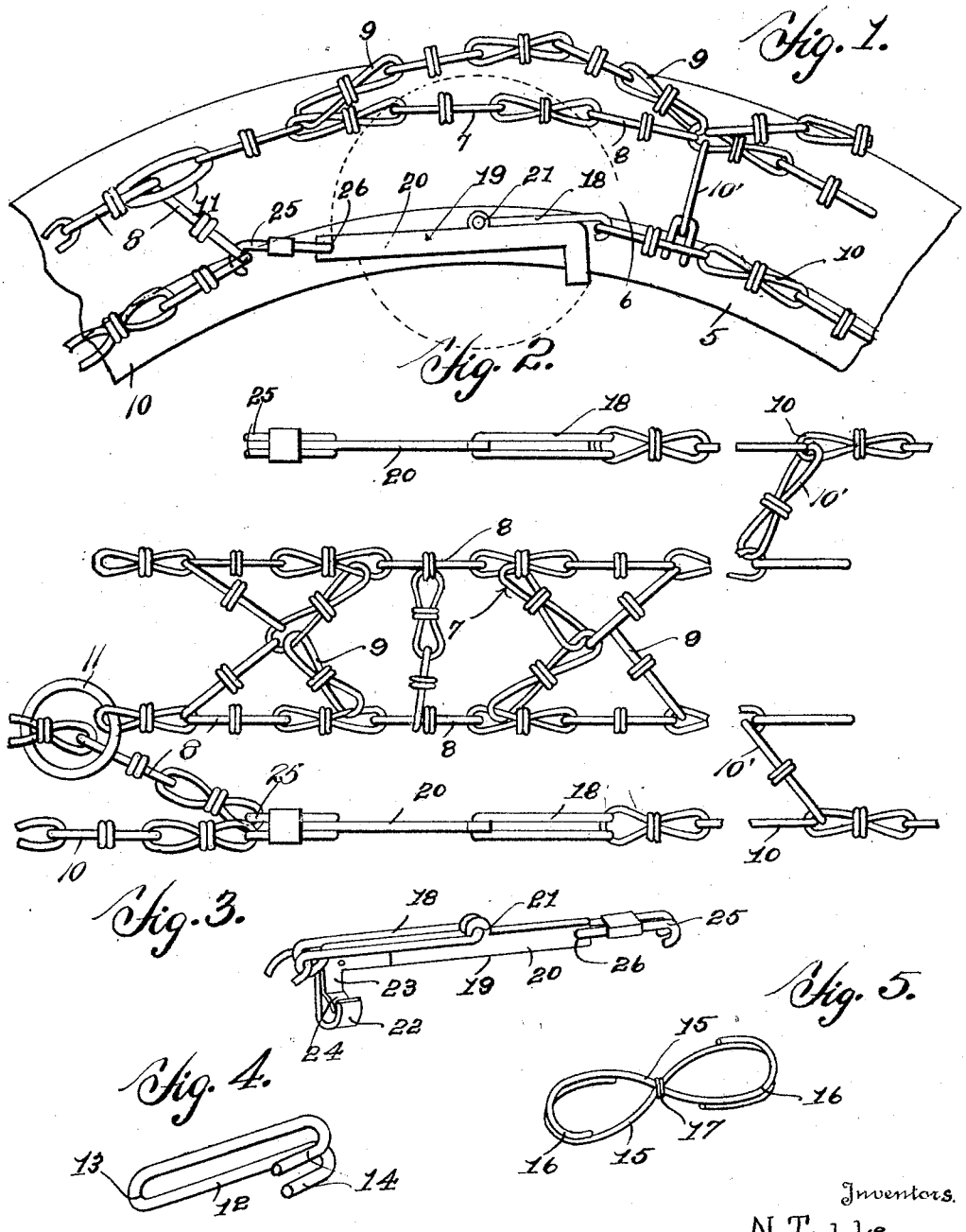

NEY TODD AND LINCOLN TODD, OF ARKVILLE, NEW YORK.

ANTISKID DEVICE FOR PNEUMATIC TIRES.

1,367,640.     Specification of Letters Patent.     Patented Feb. 8, 1921.

Application filed September 8, 1917. Serial No. 190,302.

*To all whom it may concern:*

Be it known that we, NEY TODD and LINCOLN TODD, citizens of New York, residing at Arkville, in the county of Delaware, State of New York, have invented certain new and useful Improvements in Antiskid Devices for Pneumatic Tires; and I do hereby declare the following to be a full, clear, and exact description of the invention, such as will enable others skilled in the art to which it appertains to make and use the same.

This invention is an improvement in anti-slipping devices for tires and has particular reference to an antiskid attachment for pneumatic tires.

An object of the invention is to provide an antiskid chain having improved fastening devices so constructed as to permit of readily and quickly attaching and detaching the chain which is securely maintained in its operative position by said fastening devices.

Another object is to provide an antiskid device of this character which is simple in construction, easy to manufacture and effective in carrying out the purpose for which it is designed.

The inventive idea involved is capable of receiving a variety of mechanical expressions, one of which, for the purpose of illustrating the invention, is shown in the accompanying drawing, wherein:—

Figure 1 is a fragmentary side elevation of a vehicle wheel and pneumatic tire therefor showing the antiskid device applied and in operative position.

Fig. 2 is an enlarged fragmentary plan view of the antiskid device removed.

Fig. 3 is a perspective view of one of the fastening devices used in connection with the side chains.

Fig. 4 is a similar view of one form of fastener employed for joining the tread chains.

Fig. 5 is a similar view of another form of link for the tread chains.

In the drawing the numeral 5 indicates a vehicle wheel and 6 a pneumatic tire therefor.

The antiskid device is shown in what is now believed to be its preferred form and includes a tread portion 7, a pair of side chains 10, and means whereby these elements are tightened simultaneously. The construction of the tread portion is not essential, but as herein shown it comprises parallel chains 8 intended to pass around the tire and chains or links 9 connecting them at intervals and extending in various directions across the tread face of the tire. The feature essential to the present invention is that the chains 8 are not completely circular, each having a ring 11 at one end and its other end free.

The side chains 10 are intended to lie against the sides of the tire or wheel, and are connected with the tread portion at intervals by links as shown at 10', and these chains also are not continuous rings. At each side of the wheel is a fastening and tightening device connected with one end of a side chain and carrying a claw having two hooks whereof one is connected with the other end of the side chain and the other is connected with the free end of one of the chains of the tread portion, so that when this device is tightened up tension is put onto both the side chain and the tread chain.

In addition, there may be provided with the outfit certain repair units 12 to be used as links or fasteners. One of these is shown in Fig. 4, and it consists of a single length of wire rod bent upon itself intermediate its ends, as indicated at 13 and also having its extremities 14 bent to provide a hook. The construction shown in Fig. 5 is used for replacing broken links and comprises a pair of wire rods 15 each of which is bent at its ends to provide loops 16 and the crossed intermediate portions are secured together by a tie wire 17. When this form of link is used the adjacent links of the tread portion are forced between adjacent loops and engaged therein.

The corresponding ends of the side chains 10 have connected thereto, by links 18, the fastening devices 19. Each of these devices comprise a bar 20 having a perforated ear 21 intermediate its ends adapted to receive the link 18, and one end of said bar is bent laterally to provide a hook 22. A strip 23 of resilient metal is secured to said end of the bar and has its free end bent outwardly to provide a catch or spring latch 24 which coöperates with the hook 22 to engage some link at the opposite end of the side chain when the device is applied to a tire. A claw 25 is mounted in an opening 26 in the end of the bar 20 opposite that having the hook 22 and is formed from a single length of wire rod bent in substantially the same manner as one of the fasteners 12. Its two hooks are adapted to be engaged with one of the end links of the tread portion opposite the rings 11 after said links have been passed through said rings, as shown in Fig. 1, and with one of the links in the side chain near that end of the latter opposite the point of starting. The entire bar is now swung around as indicated by the dotted lines, so that the ear 21 moves to the left and the claw 25 to the right past each other, and the snap hook 22 is engaged with some link of the chain 10 to hold the bar in this position. Such movement has put tension on the side chain and reduced it slightly in length and therefore in size, and the links 10' have drawn the chains 8 of the tread portion closely down on the tire. Also in such movement the claw has drawn on the free end of the chain 8 and caused it to slip through the ring 11, so that this chain is reduced in size and clamped around the tread of the tire. Therefore by the operation of one tightener at each side of the wheel, a double result is achieved. The obvious purpose of the claw with its hooks is to permit the latter to be engaged initially with the proper links of the chains 10 and 8 when they are comparatively taut, so that swinging of the bar will impart a substantially corresponding tension to them simultaneously.

What is claimed is:—

In an anti-skid device, a fastener and tightener for both the tread chain and the side chain, the same comprising a bar having a perforated ear at its midlength on one edge adapted for connection with one end of the side chain, a claw at one end having hooks adapted for connection with the other end of the side chain and with the tread chain, the claw adapted to pass the ear when the bar is swung to working position, and means at the other end of the bar for connecting it with the side chain to hold it in said position.

In testimony whereof, we affix our signatures in the presence of two witnesses.

NEY TODD.
LINCOLN TODD.

Witnesses:
WILLIAM S. GRAY,
JAMES W. GRAY.